(12) United States Patent
Lee et al.

(10) Patent No.: US 12,088,108 B2
(45) Date of Patent: Sep. 10, 2024

(54) SMART POWER ROUTER AND PROTECTION FOR MEDIUM VOLTAGE DC DISTRIBUTION

(71) Applicant: Hamilton Sundstrand Corporation, Charlotte, NC (US)

(72) Inventors: Yongduk Lee, Vernon, CT (US); Xin Wu, Glastonbury, CT (US); Parag M. Kshirsagar, South Windsor, CT (US); Bo Liu, Vernon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 352 days.

(21) Appl. No.: 17/342,229

(22) Filed: Jun. 8, 2021

(65) Prior Publication Data
US 2022/0393585 A1    Dec. 8, 2022

(51) Int. Cl.
*H02J 4/00* (2006.01)
*B64D 41/00* (2006.01)
*H02M 3/155* (2006.01)

(52) U.S. Cl.
CPC ............... *H02J 4/00* (2013.01); *B64D 41/00* (2013.01); *B64D 2221/00* (2013.01); *H02M 3/155* (2013.01)

(58) Field of Classification Search
CPC .. H02J 4/00; H02J 7/32; H02J 2207/20; H02J 7/342; H02J 7/0068; B64D 41/00; B64D 2221/00; H02M 3/155; H02M 5/42; H02M 1/32; H02M 3/1582
See application file for complete search history.

(56) References Cited

U.S. PATENT DOCUMENTS

| | | | | |
|---|---|---|---|---|
| 6,344,985 | B1 * | 2/2002 | Akerson | H02M 3/1582 363/65 |
| 9,337,660 | B1 * | 5/2016 | Bourstein | H02J 4/00 |
| 9,710,037 | B1 * | 7/2017 | Wade | G06F 1/266 |
| 10,020,737 | B1 * | 7/2018 | Humphrey | H02M 3/1582 |
| 10,469,011 | B2 * | 11/2019 | Golden | H02P 9/302 |

(Continued)

OTHER PUBLICATIONS

European Search Report for Application No. 22177814.5, mailed Nov. 21, 2022, 8 pages.

*Primary Examiner* — Daniel Kessie
*Assistant Examiner* — Brian K Baxter
(74) *Attorney, Agent, or Firm* — CANTOR COLBURN LLP (57) ABSTRACT

Systems and methods of operating for a smart power router for boosting and protection are provided. Aspects include a power router comprising a plurality of terminals, a first DC power supply coupled to the first terminal, a second DC power supply coupled to the second terminal, a first power converter, an interface bi-directional switch coupled between the first terminal and the second terminal, a first bi-directional switch coupled between the first terminal and the third terminal, the first bi-directional switch comprising a first transistor and a second transistor, a first RL circuit, a controller configured to operate the power router in a plurality of modes comprising a first voltage boosting mode, wherein operating the power router in the first voltage boosting mode comprises operating the interface bi-directional switch in an on state, operating the first transistor in an off state, and operating the second transistor in a switching state.

20 Claims, 10 Drawing Sheets

(56) References Cited

U.S. PATENT DOCUMENTS

| | | | |
|---|---|---|---|
| 11,251,707 B2* | 2/2022 | Chen | H02J 7/007 |
| 2006/0145538 A1* | 7/2006 | Proefrock | H02J 7/0019 |
| | | | 307/18 |
| 2008/0013351 A1* | 1/2008 | Alexander | H02M 7/4807 |
| | | | 363/123 |
| 2012/0056475 A1 | 3/2012 | Wei et al. | |
| 2015/0200551 A1* | 7/2015 | Wu | H02J 7/00306 |
| | | | 320/134 |
| 2016/0036323 A1* | 2/2016 | She | H02M 3/156 |
| | | | 307/29 |
| 2016/0049794 A1* | 2/2016 | Liu | H02J 3/38 |
| | | | 307/24 |
| 2016/0156272 A1* | 6/2016 | Miura | H02M 3/33561 |
| | | | 363/17 |
| 2018/0175740 A1 | 6/2018 | Humphrey et al. | |
| 2018/0287494 A1 | 10/2018 | Yano et al. | |
| 2019/0013679 A1* | 1/2019 | Radun | H02J 3/36 |
| 2019/0036336 A1 | 1/2019 | Kuznetsov | |
| 2019/0168634 A1 | 6/2019 | Teng | |
| 2020/0244170 A1 | 7/2020 | Chen et al. | |
| 2020/0389014 A1* | 12/2020 | Shinoda | H02H 9/04 |
| 2021/0006085 A1 | 1/2021 | Berggren et al. | |
| 2023/0036842 A1* | 2/2023 | Wang | H02M 3/3376 |

\* cited by examiner

Providing a power router comprising a plurality of terminals comprising a first terminal, a second terminal, a third terminal, and a fourth terminal, a first direct current (DC) power supply coupled to the first terminal, a second DC power supply coupled to the second terminal, an interface bi-directional switch coupled between the first terminal and the second terminal, a first bi-directional switch coupled between the first terminal and the third terminal, the first bi-directional switch comprising a first transistor and a second transistor, wherein a first source of the first transistor is coupled to a second source of the second transistor at a first node, a first resistor-inductor (RL) circuit coupled between the first terminal and the first node
1002

Operating, by a controller, the power router in a plurality of modes comprising a first voltage boosting mode, wherein operating the power router in the first voltage boosting mode comprises operating the interface bi-directional switch in an on state, operating the first transistor in an off state, and operating the second transistor in a switching state
1004

FIG. 10

SMART POWER ROUTER AND PROTECTION FOR MEDIUM VOLTAGE DC DISTRIBUTION

BACKGROUND

The present invention generally relates to medium voltage direct current (DC) distribution, and more specifically, to a smart power router and protection for medium voltage DC distribution.

Aircraft require electrical power to operate many parts of the aircraft system, including on-board flight control systems, lighting, air conditioning etc. The current and future generations of aircraft use more and more electrical control in place of convention hydraulic, pneumatic etc. control. Such more electric aircraft (MEA) have advantages in terms of the size and weight of the controls and power systems as well as in terms of maintenance and reliability.

DC power source, such as batteries, can supply power to a DC bus that provides power for a variety of power applications on an aircraft. Most current large commercial aircraft use electricity, on-board, in the form of an AC fixed frequency and/or variable frequency network. Steps have been made to move from AC power supplies to have power supplies provide medium voltage DC (MVDC), providing improvements in terms of additional functionality, power supply simplification, weight savings and thus fuel efficiency.

BRIEF DESCRIPTION

Embodiments of the present invention are directed to a system. A non-limiting example of the system includes a power router comprising a plurality of terminals comprising a first terminal, a second terminal, a third terminal, and a fourth terminal, a first direct current (DC) power supply coupled to the first terminal, a second DC power supply coupled to the second terminal, a first power converter coupled to the third terminal, an interface bi-directional switch coupled between the first terminal and the second terminal, a first bi-directional switch coupled between the first terminal and the third terminal, the first bi-directional switch comprising a first transistor and a second transistor, wherein a first source of the first transistor is coupled to a second source of the second transistor at a first node, a first resistor-inductor (RL) circuit coupled between the first terminal and the first node, a controller configured to operate the power router in a plurality of modes comprising a first voltage boosting mode, wherein operating the power router in the first voltage boosting mode comprises the controller operating the interface bi-directional switch in an on state, operating the first transistor in an off state, and operating the second transistor in a switching state.

Embodiments of the present invention are directed to a method. A non-limiting example of the method includes providing a power router comprising a plurality of terminals comprising a first terminal, a second terminal, a third terminal, and a fourth terminal, a first direct current (DC) power supply coupled to the first terminal, a second DC power supply coupled to the second terminal, an interface bi-directional switch coupled between the first terminal and the second terminal, a first bi-directional switch coupled between the first terminal and the third terminal, the first bi-directional switch comprising a first transistor and a second transistor, wherein a first source of the first transistor is coupled to a second source of the second transistor at a first node, a first resistor-inductor (RL) circuit coupled between the first terminal and the first node, operating, by a controller, the power router in a plurality of modes comprising a first voltage boosting mode, wherein operating the power router in the first voltage boosting mode comprises operating the interface bi-directional switch in an on state, operating the first transistor in an off state, and operating the second transistor in a switching state.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to making and using aspects of the invention may or may not be described in detail herein. In particular, various aspects of aircraft electric power systems to implement the various technical features described herein are well known. Accordingly, in the interest of brevity, many conventional implementation details are only mentioned briefly herein or are omitted entirely without providing the well-known system and/or process details.

Figure 1:
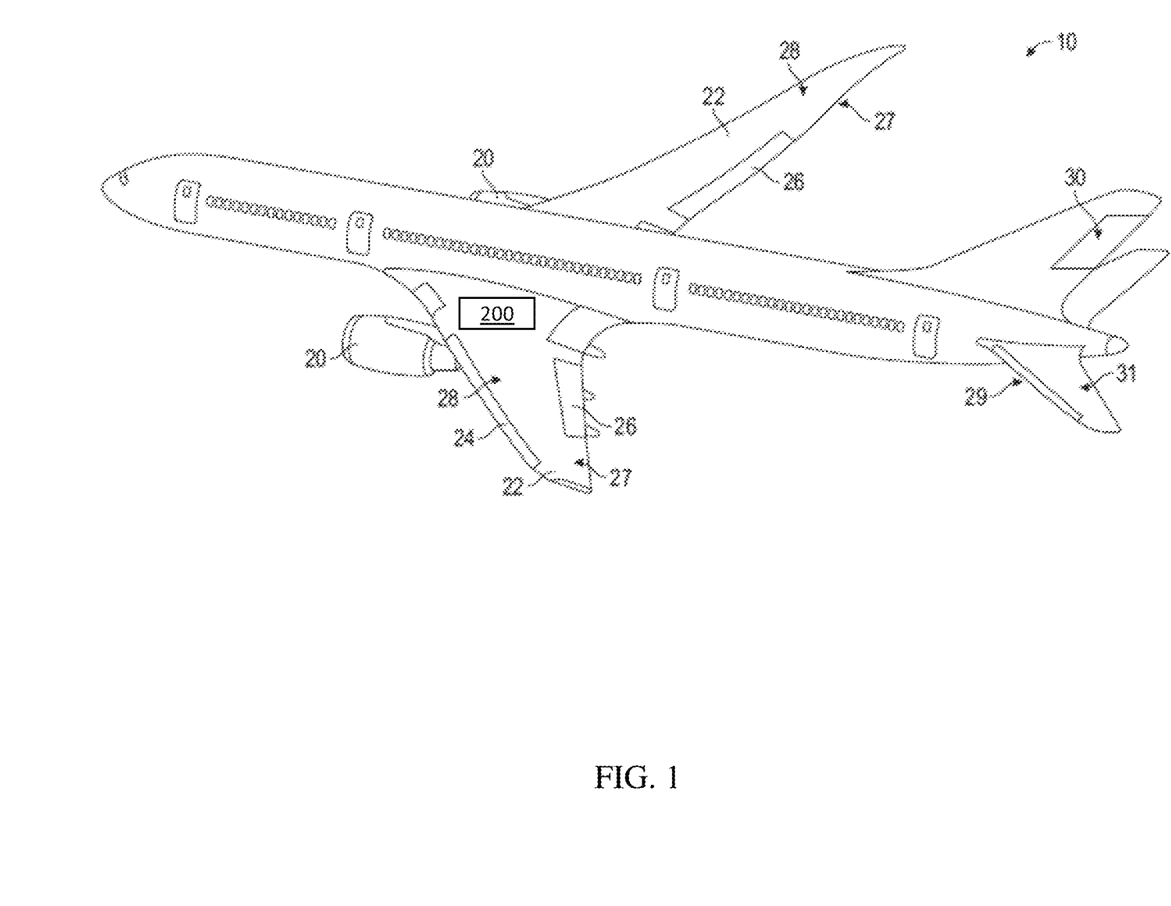
FIG. 1 is a perspective view of an aircraft that may incorporate embodiments of the present disclosure.

FIG. 1 illustrates an example of a commercial aircraft 10 having aircraft engines 20 that may embody aspects of the teachings of this disclosure. The aircraft 10 includes two wings 22 that each include one or more slats 24 and one or more flaps 26. The aircraft further includes ailerons 27, spoilers 28, horizontal stabilizer trim tabs 29, rudder 30 and horizontal stabilizer 31. The term "control surface" used herein includes but is not limited to either a slat or a flap or any of the above described. It will be understood that the slats 24 and/or the flaps 26 can include one or more slat/flap panels that move together. The aircraft 10 also includes a system 200 (described in greater detail in FIG. 2) which allows for smart power routing and protection according to one or more embodiments. The DC sources can supply power to a DC bus that provides power for a variety of power applications on the aircraft.

Turning now to an overview of technologies that are more specifically relevant to aspects of the disclosure, when the aircraft is in the air the power comes from an electric power generating system (EPGS) which typically includes one or more permanent magnet generators (PMG) that include permanent magnets mounted on a rotating shaft driven by a prime mover such as the turbine engine on the aircraft. The power generator from these PMGs can be rectified to provide a DC power supply to power a DC bus on the aircraft. In some instances, it may be desirable to have two (or more) DC power supplies operating to provide DC power to a DC bus. This allows for the DC power bus to provide more power for large loads such as an electrical propulsion system.

Although DC power systems provide advantages in terms of efficiency, reliability, and flexibility, the movement towards adopting DC technologies suffers from widespread concern over the means to protect DC distribution systems against short-circuit faults, ground faults, and open-circuit faults, especially at the medium voltage level. In fact, traditional fault protection schemes based on circuit breakers are not applicable for medium voltage direct current (MVDC) power distribution systems due to limitations including, but not limited to, (1) arcing problems due to the slow response and voltage swings; (2) low protection capability due to very slow disconnection response; (3) no DC voltage control; and (4) current rating has increased at the low voltage of a battery pack.

In one or more embodiments, addressing the above limitations, aspects of the present disclosure provide for a solid state based circuit breaker (SSCB) for a protection scheme and a DC-DC converter for voltage balancing. The SSCB can utilize bi-directional power switches (BPS) which include two series power switches across from each other. The SSCB provides fast disconnection response and high blocking voltages. The DC-DC converter provides for voltage control to the DC load. The DC-DC converter can provide benefits with respect to variable DC voltage control for system efficiency and use of low voltage battery packs. The SSCB and DC-DC converter combine for smart power routing for medium voltage DC (MVDC) distribution according to one or more embodiments.

Figure 2:
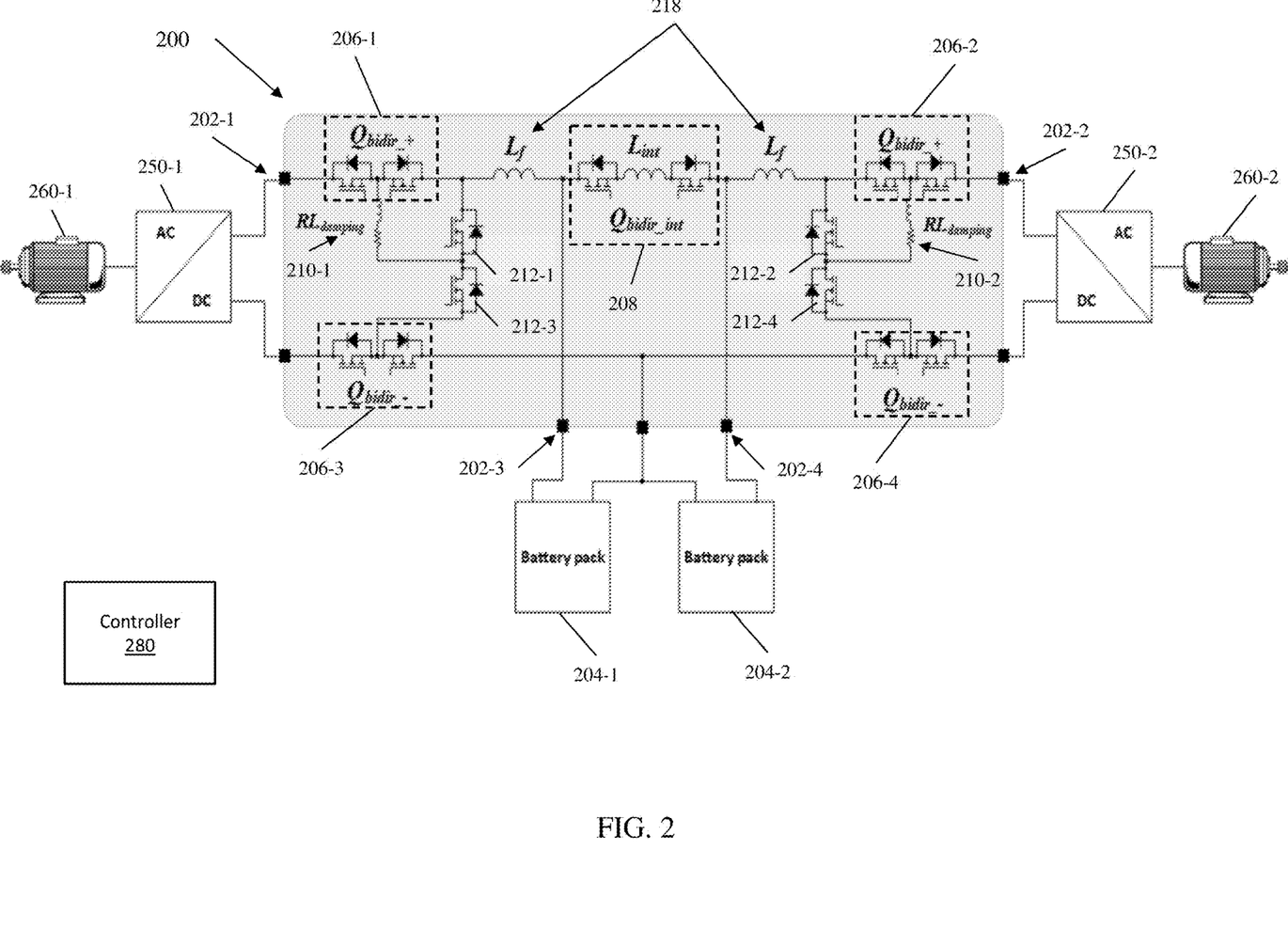
FIG. 2 depicts a block diagram of a smart power router according to one or more embodiments.

FIG. 2 depicts a block diagram of a smart power router according to one or more embodiments. The smart power router 200 includes four ports 202-1, 202-2, 202-3, 202-4 that are configured to connect to two power converters 250-1, 250-2 and two battery packs 204-1, 204-2. The smart power router 200 works as a bi-directional buck/boost converter to balance a voltage level in a DC power network. The two battery packs 204-1, 204-2 provide a DC voltage to the power converters 250-1, 250-2. The power converters 250-1, 250-2 can be connected to an AC load and/or AC source 260-1, 260-2. In one or more embodiments, the smart power router 200 can operate as a DC-DC converter with the first power converter 250-1 connected to an AC source 260-1 to boost the DC voltage coming from the first power converter 250-1 (e.g. AC/DC converter) to drive a load 260-2 connected to the second power converter 250-2 (i.e., DC/AC converter). The smart router 200 is bi-directional meaning that the AC source/loads 260-1, 260-2 can be interchangeable. In yet another embodiment, the smart router 200 can drive two AC loads 260-1, 260-2 using the battery packs 204-1, 204-2 as the DC voltage source.

In one or more embodiments, the smart power router 200 includes bi-directional power switches 206-1, 206-2, 206-3, 206-4. The bi-directional switch can be implemented with two wide band gap (WBG) device which are placed in a configuration where each transistor shares a common source. The drain of one of the WBG device is a first I/O terminal of the bi-directional switch 206-1 and the drain of the other one of the WBG device is a second I/O terminal of the bi-directional switch 206-1, for example. Bi-directional switches 206-2, 206-3, 206-4 are similarly configured. At the common source of bidirectional switches 206-1, 206-2 is a node connected to an RL damping circuit 210-1, 210-2, respectively. The RL damping circuits 210-1, 210-2 each include a resister and inductor in series connected to a first node at the common source of bidirectional switches 206-1, 206-2 and a second node between WBG devices 212-1, 212-3 and 212-2, 212-4, respectively. WBG devices 212-1, 212-2, 212-3, 212-4 can be WBG device, for example. The smart router 200 also includes filter inductors 218 positioned between the battery packs 204-1, 204-2 and the power converters 250-1, 250-2.

The smart power router 200 also includes an interface bi-direction switch 208 implemented with two WBG devices placed in series and configured with an interior inductor $L_{int}$ connected between the source terminal of each transistor. The drain of one of the WBG device can be the first I/O terminal of the interface bi-directional switch 208 and the drain of the other WBG device is a second I/O terminal of the bi-directional switch 208.

In one or more embodiments, the smart power router 200 includes a controller 280 that is configured to operate the bi-directional switches 206-1, 206-2, 206-3, 206-4, the interface bi-directional switch 208 as well as the switches 212-1, 212-2, 212-3, 212-4. The controllers 280 or any of the hardware referenced in the system 200 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

Figure 3A:
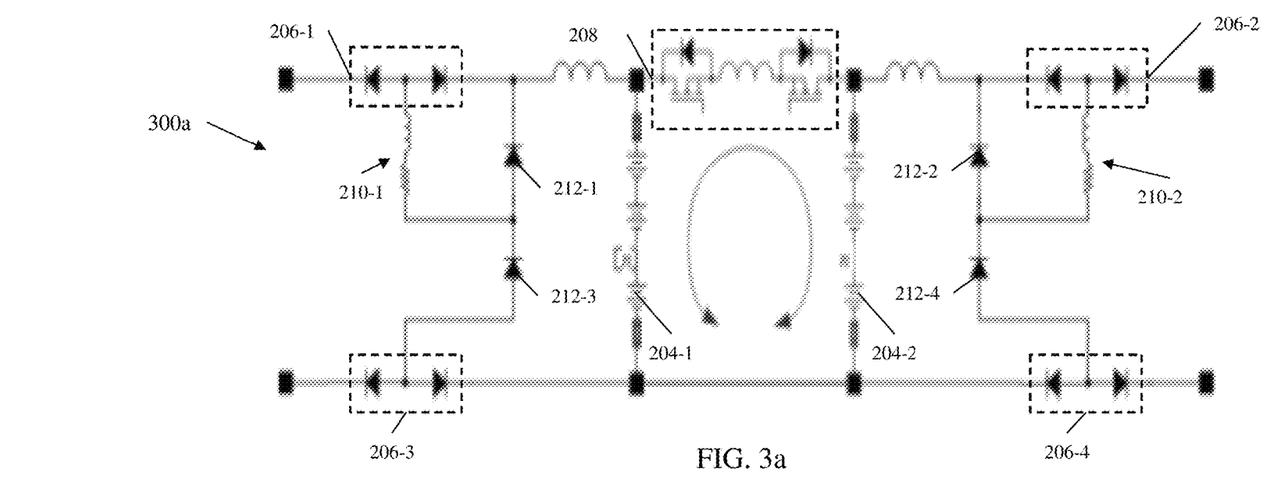
FIG. 3a depicts the smart power router operating in battery pack voltage balancing mode according to one or more embodiments.

In one or more embodiments, the smart router 200 operates as both a power converter and a protection scheme against short circuits. The power converter operation includes multiple modes of operation. The first mode of operation (mode 1) can be called the battery pack voltage balancing mode and/or the battery equalizer mode. FIG. 3a depicts the smart power router operating in battery pack voltage balancing mode according to one or more embodiments. This mode can be set up for initialization of the smart power router 300a. In this first mode, the interface bi-directional switch 208 is turned on where both transistors are in an on state. This allows the battery voltage to flow through the transistors from the interface bi-directional switch 208 and the interface inductor $L_{int}$. The remaining bidirectional switches 206-1, 206-2, 206-3, 206-4 and other transistors 212-1, 212-2, 212-3, 212-4 are in an off state. The off state is depicted in the figures as a diode. In this mode, the inrush current can be minimized between multiple paralleled batteries; thus, the power router reliability is improved.

Figure 3B:
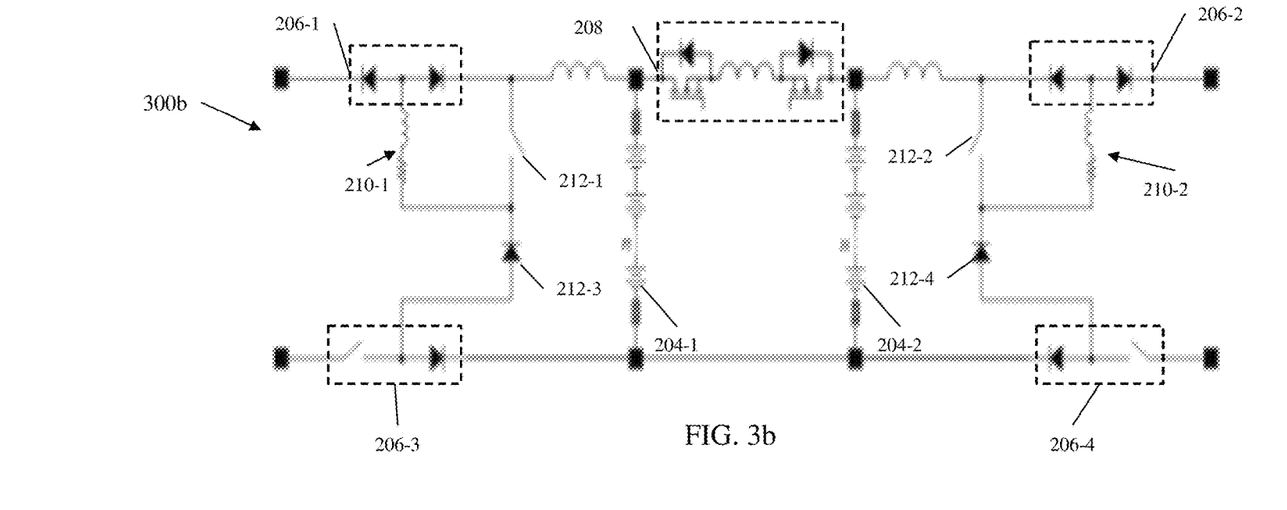
FIG. 3b depicts a circuit diagram of the power router operating in this pre-charge mode according to one or more embodiments.

In one or more embodiments, the power router 200 can operate in a second mode called the pre-charge mode (mode 2). FIG. 3b depicts a circuit diagram of the power router operating 300b in this pre-charge mode according to one or more embodiments. In this pre-charge mode, switches 212-1 and 212-2 are operating in a switching operation to allow voltage to flow from the battery packs 204-1, 204-2 through the RL damping circuits 210-1, 210-2 and the left transistor of bi-directional switch 206-1 and the right transistor of bi-directional switch 206-2 to pre-charge the line. Pre-charge refers to a preliminary mode that limits the inrush current during a powering up of a circuit. The RL damping can act as a current limiter.

Figure 4:
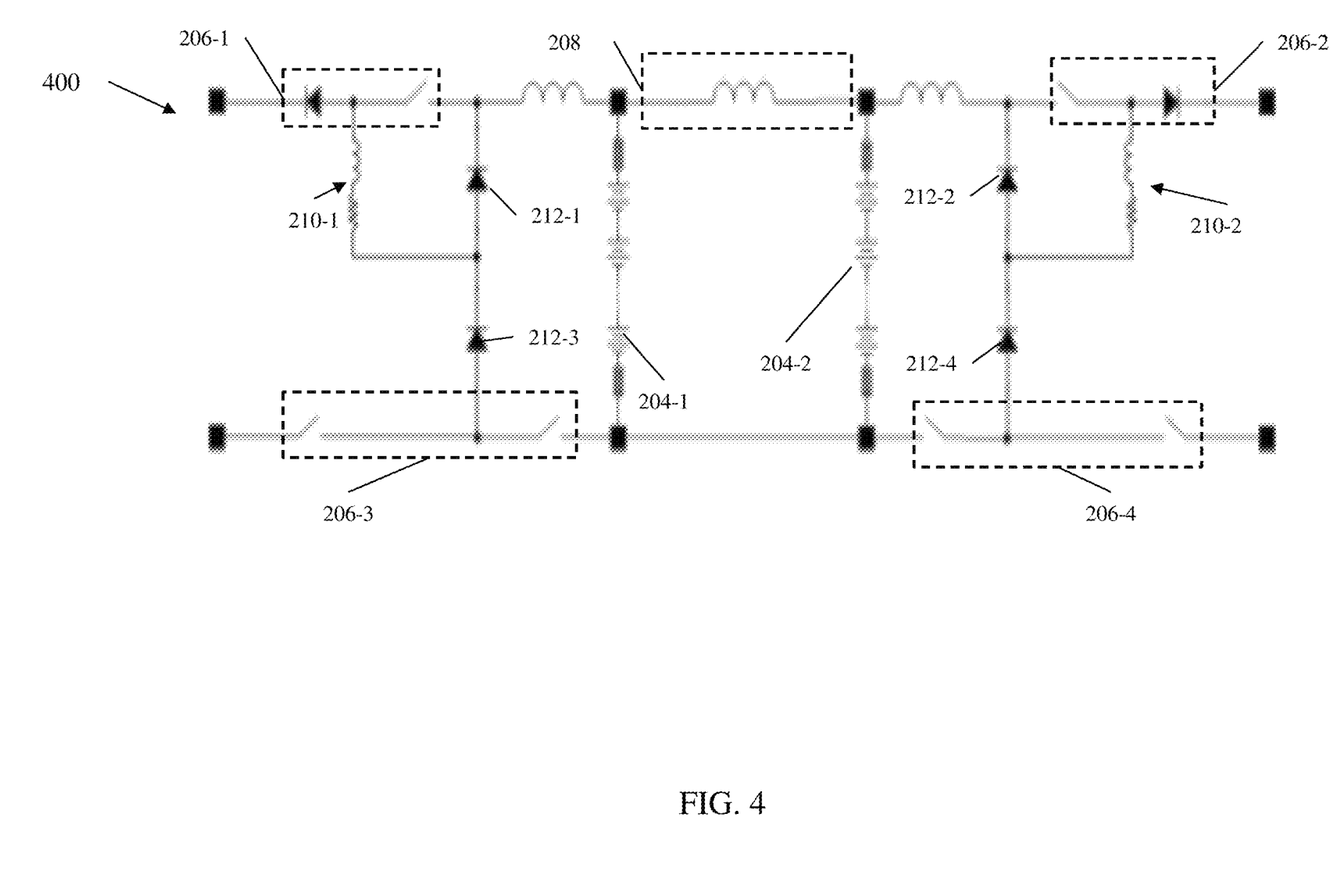
FIG. 4 depicts a circuit diagram of the power router operating 400 in this direct voltage mode.

In one or more embodiments, the power router 200 can operate in a third mode referred to as the direct voltage mode (mode 3). FIG. 4 depicts a circuit diagram of the power router operating 400 in this direct voltage mode. This mode allows for the smart router 400 to operate loads for low voltage operation. In this mode, the interface bi-directional switch 208 is in an on state and one of the transistors from bi-directional switch 206-1 and 206-2 is in a switching state. The right side transistor is switching in 206-1 and the left side transistor is witching in 206-2. In this mode, the battery packs 204-1, 204-2 supply a load voltage to their respective power converters 250-1, 250-2 (from FIG. 2) which in turn can drive a load 260-1, 260-2 (from FIG. 2). Switching state refers to cycling the opening and closing of the switches according to some timing metric. This direct voltage mode provides the same voltage level with the battery back. In this mode, the efficiency of the AC side motor can be improved.

Figure 5:
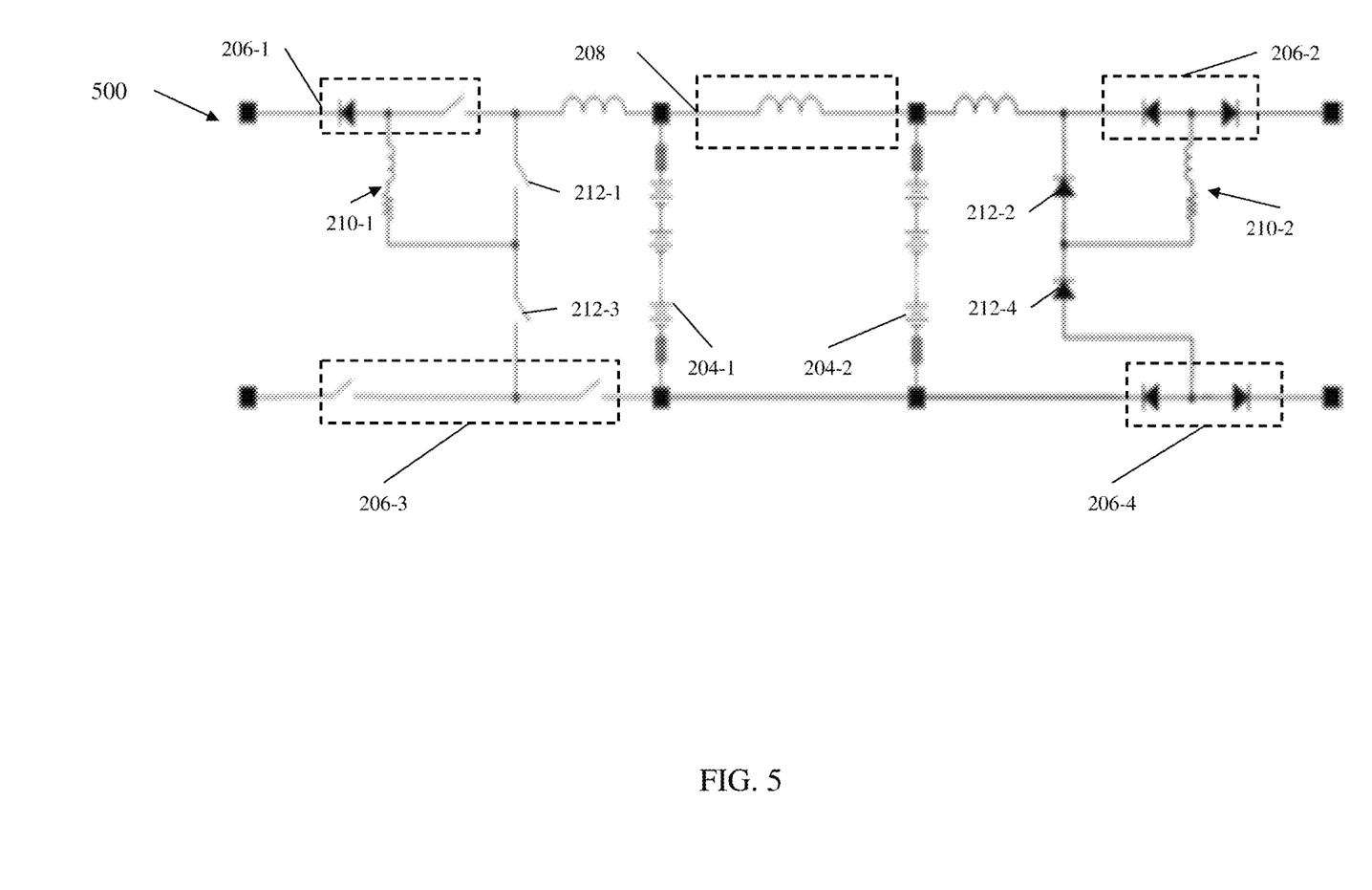
FIG. 5 depicts a circuit diagram of the operation of the power router 500 in boosting mode in a first operation where one power converter is receiving the voltage according to one or more embodiments.

In one or more embodiments, the power router 200 can operate in a fourth mode referred to as the boosting mode (mode 4). The boosting mode can operate in three different ways. FIG. 5 depicts a circuit diagram of the operation of the power router 500 in boosting mode in a first operation where one power converter is receiving the voltage according to one or more embodiments. The first operation for this mode is the supplying a boosted voltage from both battery packs 204-1, 204-2 to just the first power converter 250-1 (from FIG. 2). During this operation, voltage is supplied to just the left side of the power router 500 to power converter 250-1 (from FIG. 2). The interface bi-directional switch 208 is in an on state. The left side WBD devices for bi-directional switch 206-1 is in an off state but given the nature of this switch allows for current to flow through the attached diode of this transistor in one direction (to the left) while in this off state. The other left side switches 212-1, 212-3 and bi-directional switch 206-3 are in switching state along with the right side transistor in bi-directional switch 206-1. Switching state refers to cycling the opening and closing of the switches according to some timing metric. In one or more embodiments, the RL damping circuit 210-1 can be utilized for zero voltage switching. However, in some embodiments, the RL circuit 210-1 can have no effect in the mode because the RL circuit is in parallel with the switch 206-1.

Figure 6A:
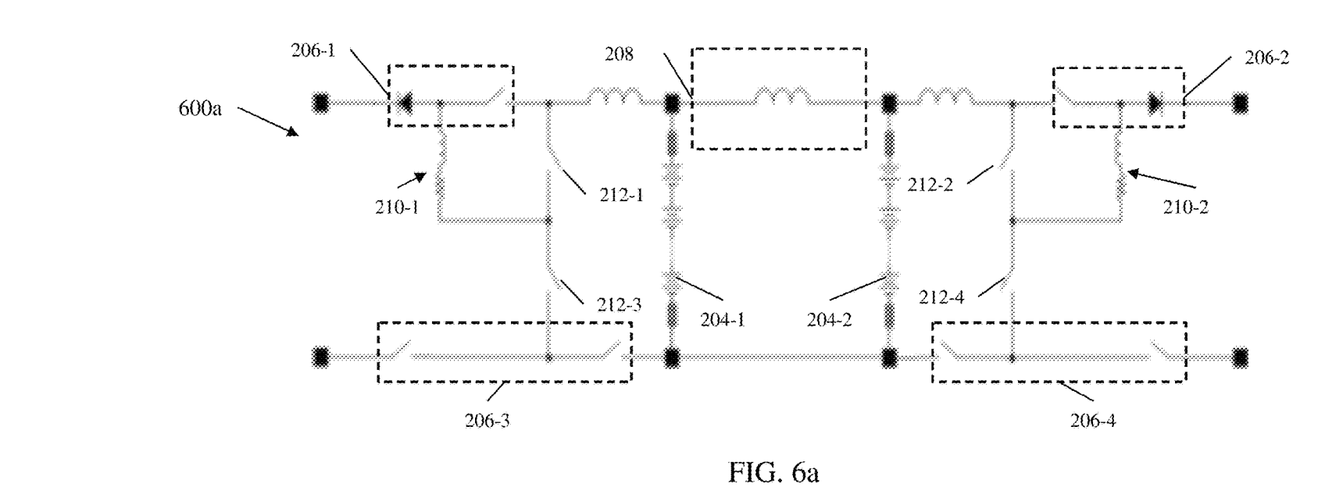
FIG. 6a depicts a circuit diagram of the power router 600a in boosting mode in a second operation where both power converters are receiving voltage according to one or more embodiments.

In one or more embodiments, a second operation for mode 4 includes the supplying of voltage to both power converters 250-1, 250-2 (from FIG. 2). FIG. 6a depicts a circuit diagram of the power router 600a in boosting mode in a second operation where both power converters are receiving voltage according to one or more embodiments. The second operation for this mode is supplying a boosted voltage from both battery backs 204-1, 204-2 to the first and second power converter 250-1, 250-2 (from FIG. 2). During this operation, the interface bi-directional switch 208 is an on state. The left side transistor for bi-directional switch 206-1 is in an off state but given the nature of this switch allows for current to flow through the attached diode of this transistor in one direction (to the left) while in this off state. The same is true of the right-side transistor for bi-directional switch 206-2 which is in an off state. The remaining switches/transistors are in switching mode. This includes the right-side transistor of bi-directional switch 206-1, the left-side transistor of bi-directional switch 206-2, switches 212-1, 212-2, 212-3, 212-4, and bi-directional switches 206-3, 206-4.

Figure 6B:
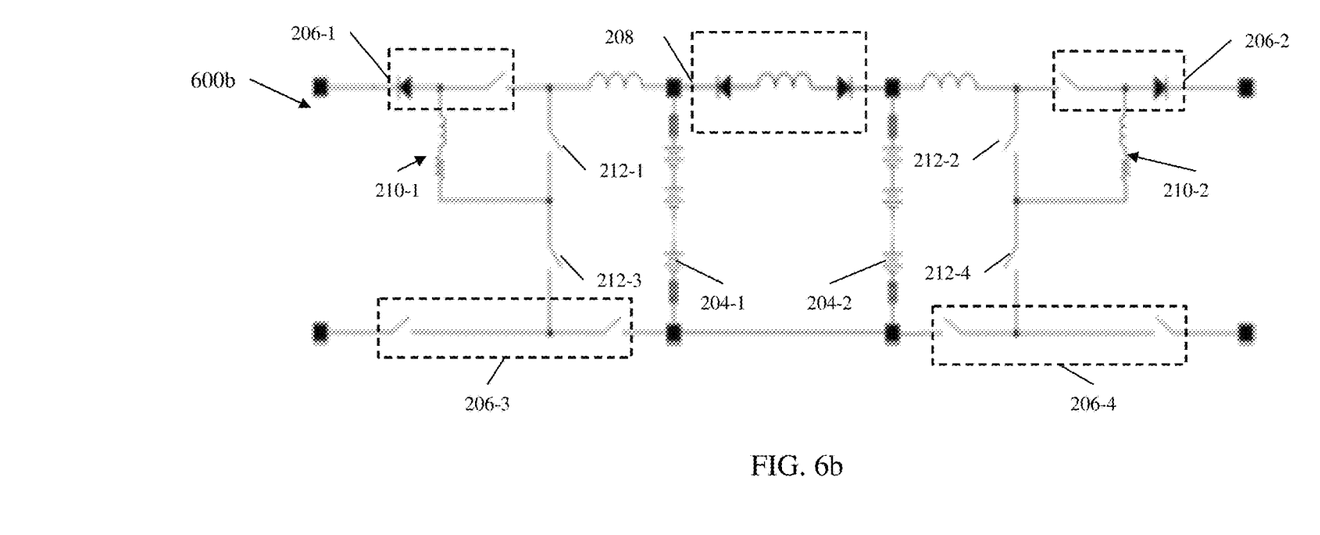
FIG. 6b depicts a circuit diagram of the power router 600b in boosting mode in a third operation where both power converters are receiving voltage independently from a respective battery pack according to one or more embodiments.

In one or more embodiments, a third operation for mode 4 includes the supplying of voltage to both power converters 250-1, 250-2 (from FIG. 2) independently from a respective battery pack 204-1, 204-2. FIG. 6b depicts a circuit diagram of the power router 600b in boosting mode in a third operation where both power converters are receiving voltage independently from a respective battery pack according to one or more embodiments. This third operation for this mode is similar to operation for the second operation except that the interface bi-directional switch 208 is now in an off state thus separating the battery packs 204-1, 204-2. In this operation, the boosted voltage from battery pack 204-1 supplies a boosted voltage to the left side power converter 250-1 (from FIG. 2) and the battery pack 204-2 supplies a boosted voltage to the right side power converter 250-2 (from FIG. 2).

Figure 7:
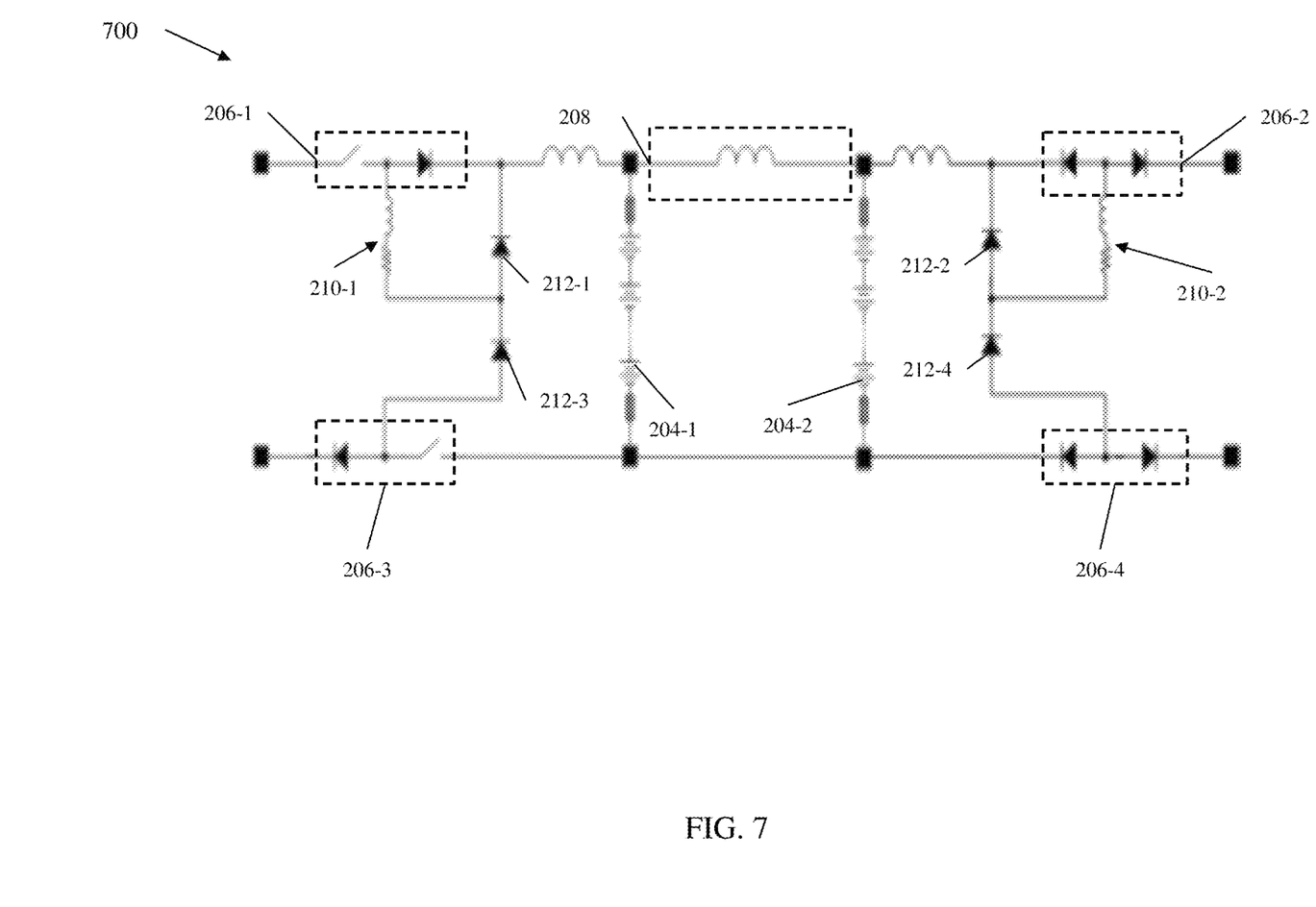
FIG. 7 depicts a circuit diagram of the power router operating in a buck mode according to one or more embodiments.

FIG. 7 depicts a circuit diagram of the power router operating in a buck mode according to one or more embodiments. The power router operating in buck mode 700 allows for the charging of the battery packs 204-1, 204-2 when the power converter 250-1 (from FIG. 2) are attached to a power supply 260-1 (from FIG. 2) such as, for example, an AC generator. The power router operating in buck mode 700 allows for power to charge up the battery packs 204-1, 204-2 by connecting a power supply to the left side terminal and operating the switches as follows. The left side transistor of bi-directional switch 206-1 is in switching mode while the right side transistor is in an off state. This allows power to flow through the RL damping circuit 210-1 through turned off switch 212-1 (through the diode) to the battery packs 204-1. Switch 212-3 is turned off. The right side transistor for bi-directional switch 206-3 is in switching mode and the left side transistor is turned off but allows power to flow through the diode. The interface bi-directional switch 208 is turned on allowing power to flow to the second battery pack 204-2. The remaining switches on the right side of the circuit 700 are turned off.

Figure 8A:
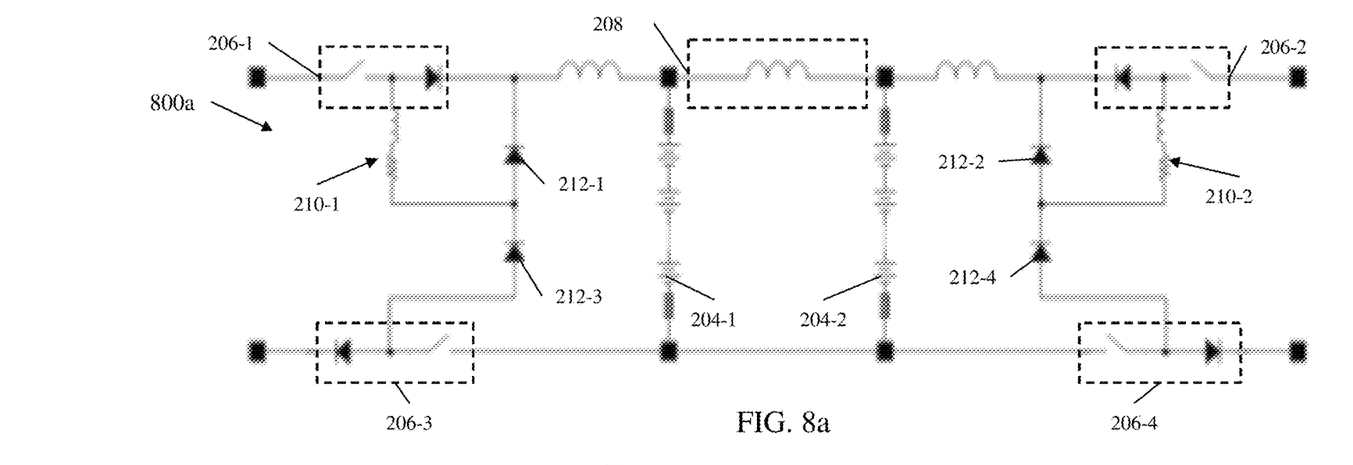
FIG. 8a depicts a circuit diagram of the power router operating in a buck mode according to one or more embodiments.

FIG. 8a depicts a circuit diagram of the power router operating in a buck mode according to one or more embodiments. The power router operating in buck mode 800a allows for the charging of battery packs 204-1, 204-2 when both power converters 250-1, 250-2 (from FIG. 2) are attached to a power supply 260-1, 260-2 (from FIG. 2). The power router operating in buck mode 800a allows for power to charge up the battery packs 204-1, 204-2 by connecting a power supply to the left and right side terminals and operating the switches as follows. The left side transistor of bi-directional switch 206-1 is in switching mode while the right side transistor is in an off state. This allows power to flow through the RL damping circuit 210-1 through turned off switch 212-1 (through the diode) to the battery packs 204-1. Switch 212-3 is turned off. The right side transistor for bi-directional switch 206-3 is in switching mode and the left side transistor is turned off but allows power to flow through the diode. The interface bi-directional switch 208 is turned on. The right side transistor of bi-directional switch 206-2 is in switching mode while the left side transistor is turned off. The right side transistor of bi-directional switch 206-4 is switching while the left side transistor is turned off. Switches 212-2, 212-4 are both off.

Figure 8B:
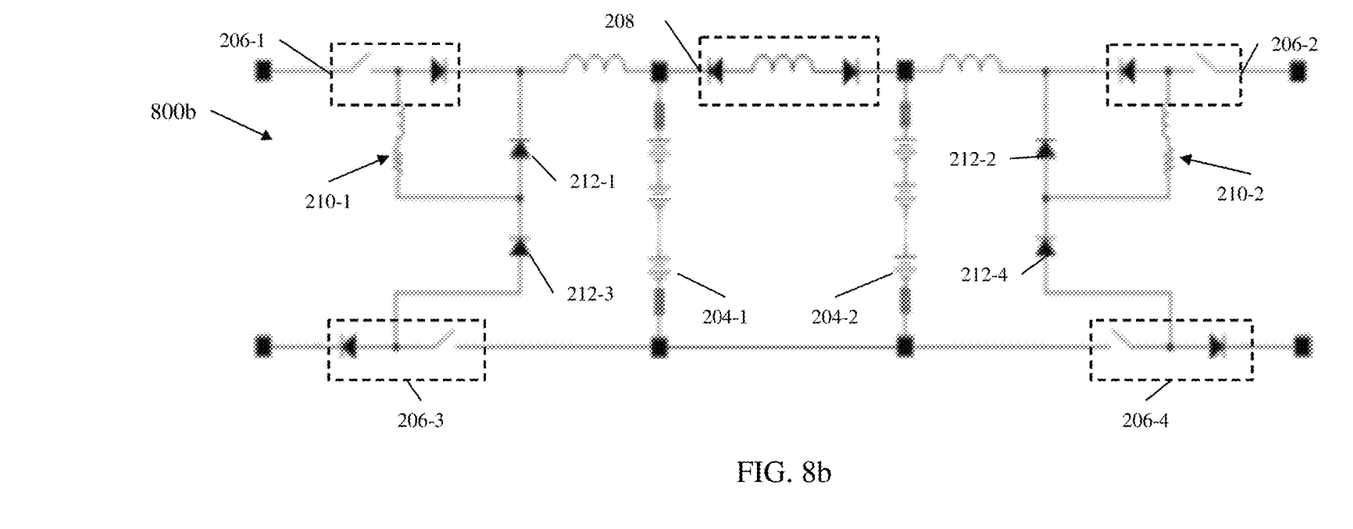
FIG. 8b depicts a circuit diagram of the power router operating in a buck mode according to one or more embodiments.

FIG. 8b depicts a circuit diagram of the power router operating in a buck mode according to one or more embodiments. The power router in buck mode 800b allows for the charging each battery pack 204-1, 204-2 from respective power supplies attached to the left side terminals and right side terminals, respectively. In this buck mode, the interface bi-directional switch 208 is turned off thus separating the circuit such that each power supply only charges one battery back 204-1 or 204-2. The remaining switching and on/off states of the switches remain the same as the description in FIG. 8a.

Figure 9A:
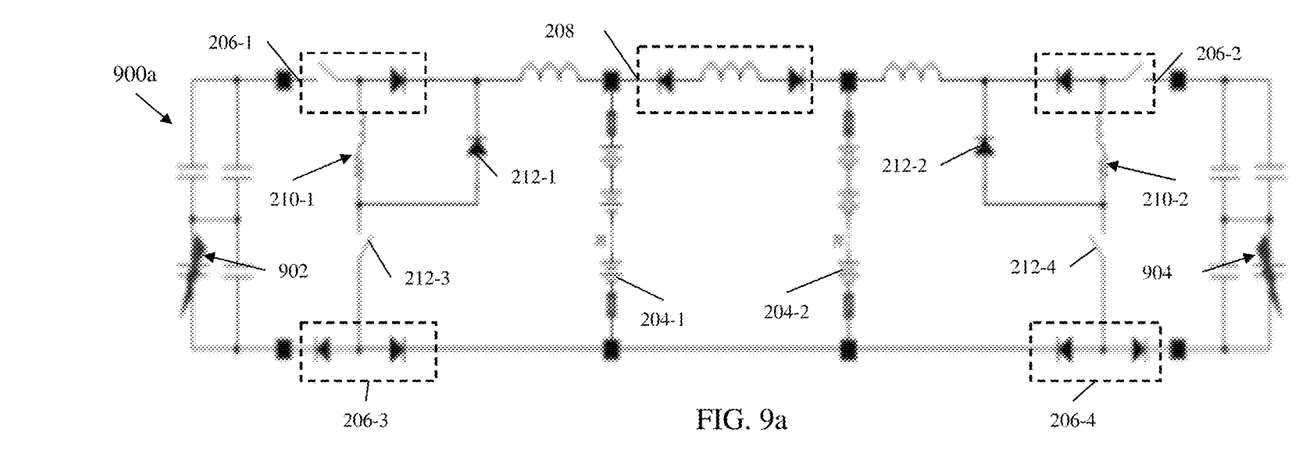
FIG. 9a depicts a circuit diagram of the power router in protection mode according to one or more embodiments.

FIG. 9a depicts a circuit diagram of the power router in protection mode according to one or more embodiments. The power router protection mode 900a provides protection from DC-link capacitor short circuits 902, 904. DC link capacitor short circuits 902, 904 refer to a terminal side short circuit (SC). The enclosure inside can have a SC. If the SC is not protected, the battery infinite current goes to the AC side of the power router. In this protection mode, the power router 900a operates the switches as follows. The left side transistor of bi-directional switch 206-1 is in switching mode while the right side transistor is in an off state. Switch 212-1 is off and switch 212-3 is in switching mode. The bi-directional switch 206-3 is in an off state. The interface bi-directional switch 208 is off. Similarly, the right side transistor of bi-directional switch 206-2 is in switching mode while the left side transistor is in an off state. Switch 212-2 is off and switch 212-4 is in a switching mode. Bi-directional switch 206-4 is off. The short circuits 902, 904 can be detected using a variety of mechanisms including hall effect sensors, sense resistors, Rogowski coil pulsed current sensing, the and the like. The controller 280 (from FIG. 2) can determine the presence of a short circuit and operate the associated switches in FIG. 9a as described above.

Figure 9B:
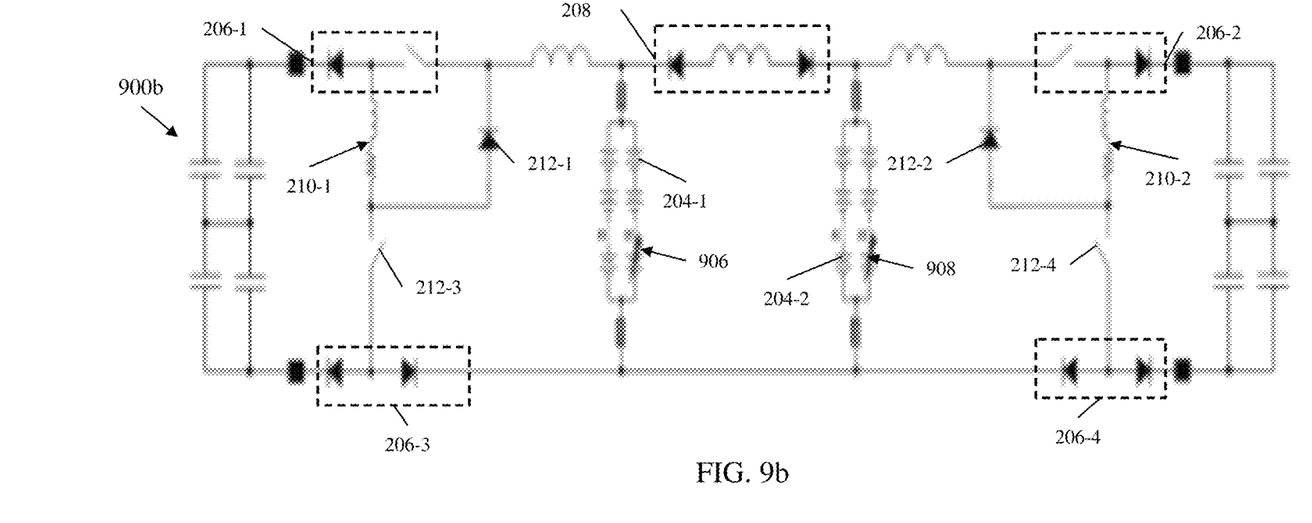
FIG. 9b depicts a circuit diagram of the power router in a protection mode according to one or more embodiments.

FIG. 9b depicts a circuit diagram of the power router in a protection mode according to one or more embodiments. The power router protection mode 900b provides protection from battery pack short circuits 906, 908. This configuration is able to block the current path. There are multiple types of short circuits (SC) that can occur in the battery packs that include, but are not limited to, one battery SC, battery module SC, and terminal side SC. In this protection mode, the power router 900b operates the switches as follows. The left side transistor of bi-directional switch 206-1 is in an off state while the right side transistor is in a switching mode. Switch 212-1 is off and switch 212-3 is in switching mode. The bi-directional switch 206-3 is in an off state. The interface bi-directional switch 208 is off. Similarly, the left side transistor of bi-directional switch 206-2 is in switching mode while the right side transistor is in an off state. Switch 212-2 is off and switch 212-4 is in a switching mode. Bi-directional switch 206-4 is off. The short circuits 906, 908 can be detected using a variety of mechanisms including hall effect sensors, sense resistors, the and the like. The controller 280 (from FIG. 2) can determine the presence of a short circuit and operate the associated switches in FIG. 9b as described above.

In one or more embodiments, the controller 280 (from FIG. 2) can operate each of the switches from the power router 200 according to the modes described in FIGS. 3-9.

Figure 10:
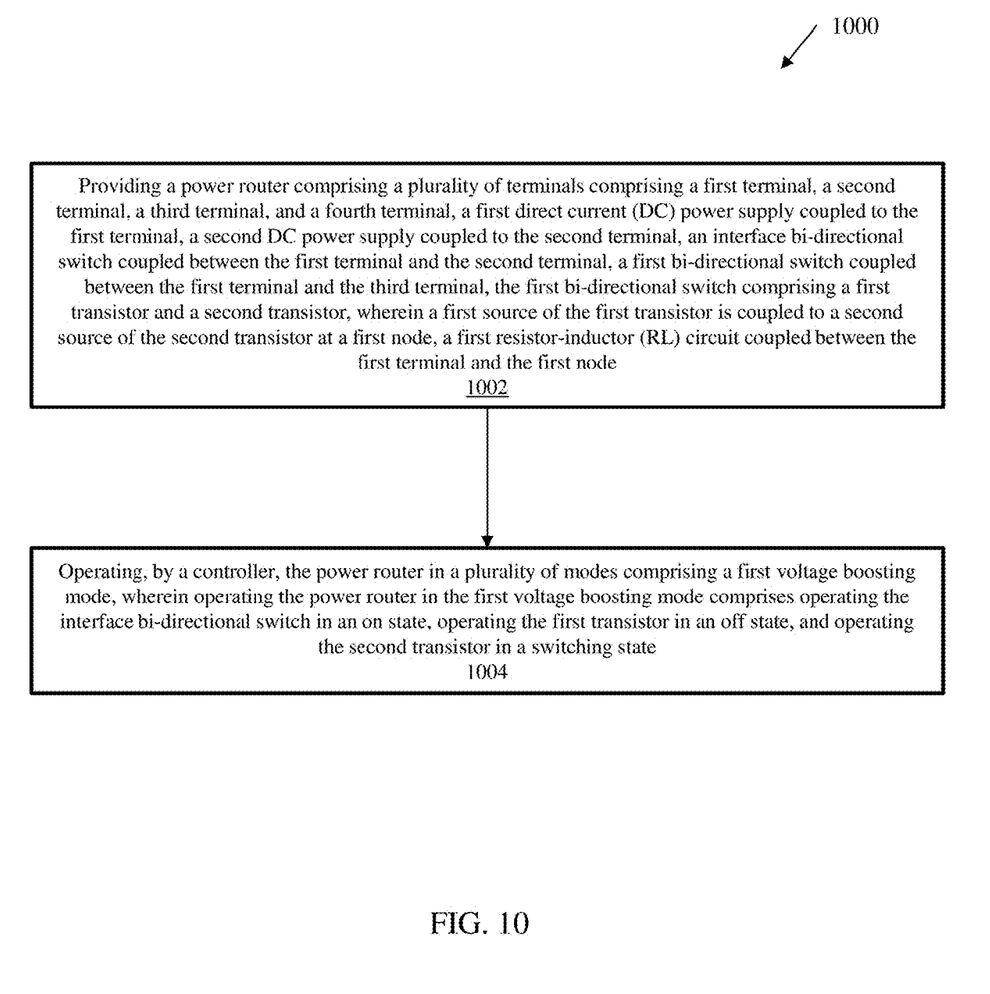
FIG. 10 depicts a flow diagram of a method for operating power router according to one or more embodiments.

FIG. 10 depicts a flow diagram of a method for operating power router according to one or more embodiments. The method 1000 includes providing a power router comprising a plurality of terminals comprising a first terminal, a second terminal, a third terminal, and a fourth terminal, a first direct current (DC) power supply coupled to the first terminal, a second DC power supply coupled to the second terminal, an interface bi-directional switch coupled between the first terminal and the second terminal, a first bi-directional switch coupled between the first terminal and the third terminal, the first bi-directional switch comprising a first transistor and a second transistor, wherein a first source of the first transistor is coupled to a second source of the second transistor at a first node, a first resistor-inductor (RL) circuit coupled between the first terminal and the first node, as shown at block 1002. And at block 1004, the method 1000 includes operating, by a controller, the power router in a plurality of modes comprising a first voltage boosting mode, wherein operating the power router in the first voltage boosting mode comprises operating the interface bi-directional switch in an on state, operating the first transistor in an off state, and operating the second transistor in a switching state.

Additional processes may also be included. It should be understood that the processes depicted in FIG. 10 represent illustrations, and that other processes may be added or existing processes may be removed, modified, or rearranged without departing from the scope and spirit of the present disclosure.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
    a power router comprising:
        a plurality of terminals comprising a first terminal, a second terminal, a third terminal, and a fourth terminal;
        a first direct current (DC) power supply coupled to the third first terminal;
        a second DC power supply coupled to the fourth terminal;
        a first power converter coupled to the first terminal;
        an interface bi-directional switch coupled between the first terminal and the second terminal;
        a bi-directional switch coupled between the first terminal and the third terminal, the bi-directional switch comprising a first transistor and a second transistor, wherein a first source of the first transistor is coupled to a second source of the second transistor at a first node;
        a resistor-inductor (RL) circuit coupled to the first node;
        a controller configured to operate the power router in a plurality of modes comprising a voltage boosting mode;
        wherein operating the power router in the voltage boosting mode comprises the controller:
            operating the interface bi-directional switch in an on state;
            operating the first transistor in an off state; and
            operating the second transistor in a switching state.

2. The system of claim 1, wherein the plurality of modes further comprises a DC-link short circuit protection mode; and
    wherein operating the power router in the DC-link short circuit protection mode comprises the controller:
        receiving an indication of a short circuit event in a DC-link capacitor coupled to the first terminal;
        operating the interface bi-directional switch in an off state;
        operating the first transistor in a switching state; and
        operating the second transistor in an off state.

3. The system of claim 1, wherein the first DC power supply comprises a first battery pack.

4. The system of claim 3, wherein the plurality of modes further comprises a battery pack short circuit protection mode; and
    wherein operating the power router in the battery pack short circuit protection mode comprises the controller:
        receiving an indication of a short circuit event in the first battery pack;
        operating the interface bi-directional switch in an off state;
        operating the first transistor in an off state; and
        operating the second transistor in a switching state.

5. The system of claim 1, wherein the bi-directional switch is a first bi-directional switch and the resistor-inductor circuit is a first RL circuit, and wherein the power router further comprises:
    a second bi-directional switch coupled between the second terminal and the fourth terminal, the second bi-directional switch comprising a third transistor and a fourth transistor, wherein a third source of the third transistor is coupled to a fourth source of the fourth transistor at a second node; and
    a second RL circuit coupled to the second node.

6. The system of claim 5, wherein the plurality of modes further comprises a direct voltage mode; and
    wherein operating the power router in the direct voltage mode comprises the controller:
        operating the interface bi-directional switch in an on state;
        operating the first transistor in an off state;
        operating the second transistor in a switching state;
        operating the third transistor in a switching state; and
        operating the fourth transistor in an off state.

7. The system of claim 5, wherein the power router further comprises:
   a fifth transistor coupled between the first RL circuit and the interface bidirectional switch; and
   a sixth transistor coupled between the second RL circuit and the interface bidirectional switch;
   wherein the first RL circuit is between the first node and the fifth switch and the second RL circuit is between the second node and the sixth switch.

8. The system of claim 7, wherein the plurality of modes further comprises a pre-charge mode; and
   wherein operating the power router in the pre-charge mode comprises the controller:
      operating the interface bi-directional switch in an on state;
      operating the first bi-directional switch in an off state;
      operating the fifth transistor in a switching state;
      operating the second bi-directional switch in an off state; and
      operating the sixth transistor in a switching state.

9. The system of claim 7, wherein the plurality of modes further comprises a shared voltage boosting mode;
   wherein operating the power router in the shared voltage boosting mode comprises the controller:
      operating the interface bi-directional switch in an on state;
      operating the first transistor in an off state;
      operating the second transistor in a switching state;
      operating the third transistor in a switching state;
      operating the fourth transistor in an off state;
      operating the fifth transistor in a switching state; and
      operating the sixth transistor in a switching state.

10. The system of claim 7, wherein the plurality of modes further comprises an individual source voltage boosting mode;
    wherein operating the power router in the individual source voltage boosting mode comprises the controller:
       operating the interface bi-directional switch in an off state;
       operating the first transistor in an off state;
       operating the second transistor in a switching state;
       operating the third transistor in a switching state;
       operating the fourth transistor in an off state;
       operating the fifth transistor in a switching state; and
       operating the sixth transistor in a switching state.

11. The system of claim 1, wherein the second DC power supply comprises a battery pack.

12. The system of claim 1, further comprises a second power converter coupled to the second terminal.

13. The system of claim 1, wherein the interface bi-directional switch comprises a first interface transistor, a second interface transistor, and an interface inductor.

14. The system of claim 13, wherein the interface inductor is coupled between a first interface source of the first interface transistor and a second interface source of the second interface transistor.

15. A method comprising:
    providing a power router comprising:
       a plurality of terminals comprising a first terminal, a second terminal, a third terminal, and a fourth terminal;
       a first direct current (DC) power supply coupled to the third terminal;
       a second DC power supply coupled to the fourth terminal;
       an interface bi-directional switch coupled between the first terminal and the second terminal;
       a bi-directional switch coupled between the first terminal and the third terminal, the bi-directional switch comprising a first transistor and a second transistor, wherein a first source of the first transistor is coupled to a second source of the second transistor at a first node;
       a resistor-inductor (RL) circuit coupled to the first node;
    operating, by a controller, the power router in a plurality of modes comprising a voltage boosting mode, wherein operating the power router in the voltage boosting mode comprises:
       operating the interface bi-directional switch in an on state;
       operating the first transistor in an off state; and
       operating the second transistor in a switching state.

16. The method of claim 15, wherein the plurality of modes further comprises a DC-link short circuit protection mode; and
    wherein operating the power router in the DC-link short circuit protection mode comprises:
       receiving, by the controller, an indication of a short circuit event in a DC-link capacitor coupled to the first terminal;
       operating the interface bi-directional switch in an off state;
       operating the first transistor in a switching state; and
       operating the second transistor in an off state.

17. The method of claim 15, wherein the first DC power supply comprises a battery pack.

18. The method of claim 17, wherein the plurality of modes further comprises a battery pack short circuit protection mode; and
    wherein operating the power router in the battery pack short circuit protection mode comprises the controller:
       receiving an indication of a short circuit event in the first battery pack;
       operating the interface bi-directional switch in an off state;
       operating the first transistor in an off state; and
       operating the second transistor in a switching state.

19. The method of claim 15, wherein the bi-directional switch is a first bi-directional switch and the resistor-inductor circuit is a first RL circuit, and wherein the power router further comprises:
    a second bi-directional switch coupled between the second terminal and the fourth terminal, the second bi-directional switch comprising a third transistor and a fourth transistor, wherein a third source of the third transistor is coupled to a fourth source of the fourth transistor at a second node; and
    a second RL circuit coupled to the second node.

20. The method of claim 19, wherein the plurality of modes further comprises a direct voltage mode; and
    wherein operating the power router in the direct voltage mode comprises:
       operating the interface bi-directional switch in an on state;
       operating the first transistor in an off state;
       operating the second transistor in a switching state;
       operating the third transistor in a switching state; and
       operating the fourth transistor in an off state.

* * * * *